United States Patent
Boyer et al.

(10) Patent No.: US 8,726,660 B2
(45) Date of Patent: *May 20, 2014

(54) DUAL-INLET SUPERCHARGER FOR EGR FLOW CONTROL

(75) Inventors: Brad Alan Boyer, Canton, MI (US); Eric Warren Curtis, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 111 days.

This patent is subject to a terminal disclaimer.

(21) Appl. No.: 13/356,536

(22) Filed: Jan. 23, 2012

(65) Prior Publication Data

US 2012/0124996 A1 May 24, 2012

Related U.S. Application Data

(62) Division of application No. 12/751,744, filed on Mar. 31, 2010, now Pat. No. 8,099,957.

(51) Int. Cl.
| | |
|---|---|
| *F02B 33/44* | (2006.01) |
| *F02M 25/07* | (2006.01) |
| *F02B 33/00* | (2006.01) |
| *F04C 2/00* | (2006.01) |
| *F01C 1/18* | (2006.01) |
| *F01C 1/24* | (2006.01) |
| *F04C 18/00* | (2006.01) |

(52) U.S. Cl.
USPC ........... 60/612; 60/605.1; 60/605.2; 123/562; 418/15; 418/206.1

(58) Field of Classification Search
USPC ......... 60/612, 605.1–605.2; 123/562; 418/15, 418/206.1; 429/22
See application file for complete search history.

(56) References Cited

U.S. PATENT DOCUMENTS

| | | | | |
|---|---|---|---|---|
| 2,580,006 | A | * 12/1951 | Densham | 418/15 |
| 4,631,009 | A | * 12/1986 | Cygnor et al. | 418/15 |
| 5,239,960 | A | 8/1993 | Sasaki et al. | |
| 5,439,358 | A | 8/1995 | Weinbrecht | |
| 5,509,394 | A | 4/1996 | Hitomi et al. | |
| 5,617,726 | A | 4/1997 | Sheridan et al. | |
| 6,062,026 | A | 5/2000 | Woollenweber et al. | |
| 6,283,734 | B1 | 9/2001 | Blume | |
| 6,626,164 | B2 | 9/2003 | Hitomi et al. | |
| 6,668,783 | B2 | 12/2003 | Taylor | |
| 6,705,847 | B1 | 3/2004 | Sagawe et al. | |
| 6,722,129 | B2 | 4/2004 | Criddle et al. | |
| 6,983,730 | B2 | 1/2006 | Kuzuyama | |
| 7,094,042 | B1 | 8/2006 | Borgetti et al. | |
| 7,107,962 | B1 | 9/2006 | Spies et al. | |
| 7,281,531 | B1 | 10/2007 | Fulton et al. | |

(Continued)

FOREIGN PATENT DOCUMENTS

| | | | | |
|---|---|---|---|---|
| DE | 102009053463 A1 | * 5/2011 | | F02M 25/07 |
| JP | 6147026 A | 5/1994 | | |

*Primary Examiner* — Thai Ba Trieu
(74) *Attorney, Agent, or Firm* — Julia Voutyras; Alleman Hall McCoy Russell & Tuttle LLP

(57) ABSTRACT

A supercharger compressor includes a plurality of rotors rotatably mounted in a housing, a first inlet for air, a second inlet for recirculated exhaust gas, and a flow separator. The flow separator is arranged interior the housing and configured to form a slideable seal with at least one rotor of the plurality of rotors, the slideable seal fluidically isolating the first inlet from the second inlet, at least in part, and retarding pressure equalization therebetween.

15 Claims, 3 Drawing Sheets

(56) References Cited

U.S. PATENT DOCUMENTS

| | | |
|---|---|---|
| 7,395,948 B2 | 7/2008 | Kogan |
| 7,703,442 B2 | 4/2010 | Sauer et al. |
| 7,781,084 B2 * | 8/2010 | Hild et al. ............ 429/413 |
| 7,788,016 B2 | 8/2010 | Casal Kulzer et al. |
| 8,099,957 B2 * | 1/2012 | Boyer et al. ............ 60/612 |
| 2007/0266705 A1 * | 11/2007 | Wood et al. ............ 123/559.1 |
| 2009/0007563 A1 | 1/2009 | Cooper et al. |
| 2011/0214421 A1 * | 9/2011 | Schmitt et al. ............ 60/605.2 |

* cited by examiner

DUAL-INLET SUPERCHARGER FOR EGR FLOW CONTROL

CROSS REFERENCE TO RELATED APPLICATIONS

The present application is a divisional of U.S. patent application Ser. No. 12/751,744 filed Mar. 31, 2010 now U.S. Pat. No. 8,099,957, the entire contents of which are incorporated herein by reference for all purposes.

TECHNICAL FIELD

This application relates to the field of motor-vehicle engineering, and more particularly, to air induction and exhaust-gas recirculation in motor vehicle engine systems.

BACKGROUND AND SUMMARY

A boosted engine may exhibit higher combustion and exhaust temperatures than a naturally aspirated engine of similar output power. Such higher temperatures may cause increased nitrogen-oxide (NOX) emissions from the engine and may accelerate materials ageing, including exhaust-aftertreatment catalyst ageing. Exhaust-gas recirculation (EGR) is one approach for combating these effects. EGR works by diluting the intake air charge with exhaust gas, thereby reducing its oxygen content. When the resulting air-exhaust mixture is used in place of ordinary air to support combustion in the engine, lower combustion and exhaust temperatures result. EGR may also improve fuel economy in gasoline engines by reducing throttling losses and heat rejection.

In boosted engine systems equipped with a turbocharger compressor mechanically coupled to a turbine, exhaust gas may be recirculated through a high pressure (HP) EGR loop and/or through a low-pressure (LP) EGR loop. In the HP EGR loop, the exhaust gas is taken from upstream of the turbine and is mixed with the intake air downstream of the compressor. In an LP EGR loop, the exhaust gas is taken from downstream of the turbine and is mixed with the intake air upstream of the compressor.

HP and LP EGR strategies achieve optimum efficacy in different regions of the engine load-speed map. Moreover, each strategy presents its own control-system challenges. For example, HP EGR is most effective at low loads, where intake vacuum provides ample flow potential. At higher loads, it may be difficult to maintain the desired EGR flow rate. On the other hand, LP EGR provides adequate flow from mid to high engine loads, but may respond sluggishly to changing engine load, engine speed, or intake air flow. In gasoline engines especially, such unsatisfactory transient response may include combustion instability during TIP-out conditions, when fresh air is needed to sustain combustion but EGR-diluted air is present upstream of the throttle valve. Moreover, a significant lag in EGR availability can occur during TIP-in conditions, as the amount of EGR accumulated in the intake manifold may not be sufficient to provide the desired combustion and/or emissions-control performance.

It has previously been recognized that incorporating a second, supercharger compressor in a turbocharged engine system can help address flow potential and transient control issues as noted above. For example, U.S. Patent Application Publication 2009/0007563 describes a boosted diesel-engine system in which a supercharger is coupled downstream of a turbocharger compressor. The supercharger is operated in part to provide boost when the engine speed is relatively low and the turbocharger is incapable of providing the desired compression. In the disclosed systems, the EGR flow rate is controlled by varying supercharger and turbocharger boost, which affects the EGR flow potential. The supercharger is further used to actively pump the EGR when the engine speed is high and the turbocharger alone is capable of providing the desired compression. During such conditions, intake air flow from the turbocharger compressor is by-passed around the supercharger.

Despite its potential usefulness, the approach cited above suffers from at least one drawback. Specifically, inducted air and EGR are admitted to the supercharger through a common inlet, where pressure equalization can occur prior to compression. As a result, the rate at which EGR is supplied through the supercharger depends on the air pressure at the common inlet, which in turn depends on the level of boost provided by the turbocharger, the states of various by-pass and control valves, and other factors. Taking these dependencies into account may result in a complex EGR-control strategy.

The inventors herein have recognized that a specially configured supercharger compressor can be used to provide boost for an engine system and also enable improved and/or simplified EGR flow control. Accordingly, one embodiment provides a supercharger compressor comprising a plurality of rotors rotatably mounted in a housing, a first inlet for air, a second inlet for recirculated exhaust gas, and a flow separator arranged interior the housing. The flow separator is configured to form a slideable seal with one or more of the rotors. The slideable seal fluidically isolates the first inlet from the second inlet, at least in part, and retards pressure equalization therebetween. In this manner, undesired pressure equalization between inducted air and EGR upstream of the supercharger can be reduced or avoided, resulting in simplified EGR flow control.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

The subject matter of this disclosure is now described by way of example and with reference to certain illustrated embodiments. Components that may be substantially the same in two or more embodiments are identified coordinately and are described with minimal repetition. It will be noted, however, that components identified coordinately in the different embodiments may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
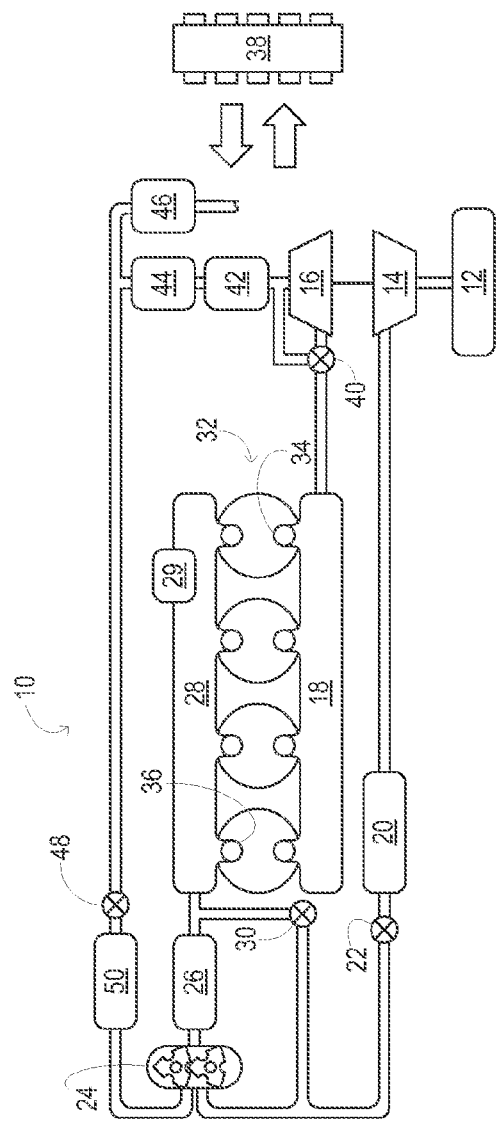
FIGS. 1 and 2 schematically show aspects of example engine systems in accordance with different embodiments of this disclosure.

FIG. 1 schematically shows aspects of an example engine system 10 in one embodiment. In engine system 10, fresh air is inducted via air cleaner 12 and flows to turbocharger compressor 14. The turbocharger compressor is mechanically coupled to turbine 16, the turbine driven by expanding engine exhaust from exhaust manifold 18. In one embodiment, the turbocharger compressor and turbine may be coupled within a twin scroll turbocharger. In another embodiment, the turbocharger may be a variable geometry turbocharger (VGT), where turbine geometry is actively varied as a function of engine speed. From the turbocharger compressor, the pressurized air charge flows through first charge-air cooler 20 and on to throttle valve 22. The first charge-air cooler may be any suitable heat exchanger configured to cool the air charge for desired combustion and emissions-control performance.

Coupled downstream of throttle valve 22 is supercharger compressor 24. The supercharger compressor may be any suitable intake-air compressor—a motor-driven or driveshaft driven supercharger compressor, for example. From the supercharger compressor, the intake air charge flows through second charge-air cooler 26 en route to intake manifold 28. The second charge-air cooler may be any suitable heat exchanger configured to cool the air charge to temperatures suitable for admission to the intake manifold. Manifold air pressure sensor 29 is coupled to the intake manifold and configured to respond to the pressure level therein.

In the embodiment shown in FIG. 1, compressor by-pass valve 30 is coupled between the air inlet of supercharger compressor 24 and the outlet of second charge-air cooler 26. The compressor by-pass valve may be a normally closed valve configured to open at the command of an electronic control system (vide infra) in order to relieve excess boost pressure of the supercharger compressor under selected operating conditions. For example, the compressor by-pass valve may be opened during conditions of decreasing engine speed to avert surge in the supercharger compressor.

In engine system 10, exhaust manifold 18 and intake manifold 28 are coupled, respectively, to a series of combustion chambers 32 through a series of exhaust valves 34 and intake valves 36. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desired combustion and emissions-control performance. In particular, the valve timing may be adjusted so that combustion is initiated when exhaust from a previous combustion is still present in one or more combustion chambers. Such adjusted valve timing may enable an 'internal EGR' mode useful for reducing peak combustion temperatures under selected operating conditions. In some embodiments, adjusted valve timing may be used in addition to the 'external EGR' modes described hereinafter. Via any suitable combination or coordination of internal and external EGR modes, the intake manifold may be adapted to receive exhaust from combustion chambers 32 under selected operating conditions.

FIG. 1 shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber at the time of ignition. To assess operating conditions in connection with various control functions of the engine system, the electronic control system may be operatively coupled to a plurality of sensors arranged throughout the engine system—flow sensors, temperature sensors, pedal-position sensors, pressure sensors, etc.

In combustion chambers 32 combustion may be initiated via spark ignition and/or compression ignition in any variant. Further, the combustion chambers may be supplied any of a variety of fuels: gasoline, alcohols, diesel, biodiesel, compressed natural gas, etc. Fuel may be supplied to the combustion chambers via direct injection, port injection, throttle-body injection, or any combination thereof.

As noted above, exhaust from exhaust manifold 18 flows to turbine 16 to drive the turbine. When reduced turbine torque is desired, some exhaust may be directed instead through waste gate 40, by-passing the turbine. The combined flow from the turbine and the waste gate then flows through exhaust-aftertreatment devices 42 and 44. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap NOX from the exhaust flow when the exhaust flow is lean, and to reduce the trapped NOX when the exhaust flow is rich. In other examples, an exhaust-aftertreatment catalyst may be configured to disproportionate NOX or to selectively reduce NOX with the aid of a reducing agent. In still other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow.

Continuing in FIG. 1, all or part of the treated exhaust from the exhaust aftertreatment devices may be released into the ambient via silencer 46. Depending on operating conditions, however, some treated exhaust may instead be diverted through EGR valve 48, which is coupled upstream of EGR cooler 50. The EGR cooler may be any suitable heat exchanger configured to cool the exhaust flow to temperatures suitable for mixing into the intake air charge.

From EGR cooler 50, the cooled exhaust gas enters supercharger compressor 24. As shown in FIG. 1 and subsequent drawings, the supercharger compressor includes two independent inlets—an air inlet configured to admit intake air from throttle valve 22, and an EGR inlet configured to admit exhaust gas from EGR cooler 50. Further, the supercharger compressor may be configured to pump both air and EGR at volume rates that are largely independent of the pressure at either inlet. Such a configuration provides significant flow-control advantages. Moreover, the supercharger compressor may be configured to provide effective mixing of the pressurized EGR and intake air, so that the diluted air charge provided to the intake manifold is substantially homogeneous. From supercharger compressor 24, the compressed mixture of air and EGR flows through second charge-air cooler 26 en route to intake manifold 28.

In some embodiments, throttle valve 22, compressor by-pass valve 30, waste gate 40, and/or EGR valve 48 may be electronically controlled valves configured to close and open at the command of electronic control system 38. Further, one or more of these valves may be continuously adjustable. The electronic control system may be operatively coupled to each of the electronically controlled valves and configured to command their opening, closure, and/or adjustment as needed to enact any of the control functions described herein.

By appropriately controlling EGR valve 48, and by adjusting the exhaust and intake valve timing (vide supra), electronic control system 38 may enable engine system 10 to deliver intake air to combustion chambers 32 under varying operating conditions. These include conditions where EGR is omitted from the intake air or is provided internal to each combustion chamber (via adjusted valve timing, for example), and conditions where EGR is drawn from a low-pressure take-off point downstream of turbine 16.

It will be understood that no aspect of FIG. 1 is intended to be limiting. In particular, the low-pressure take-off point may differ in embodiments fully consistent with this disclosure. While FIG. 1 shows EGR being taken from downstream of exhaust-aftertreatment device 44, the EGR may in other embodiments be taken from upstream of any or all exhaust-aftertreatment devices in the engine system.

Figure 2:
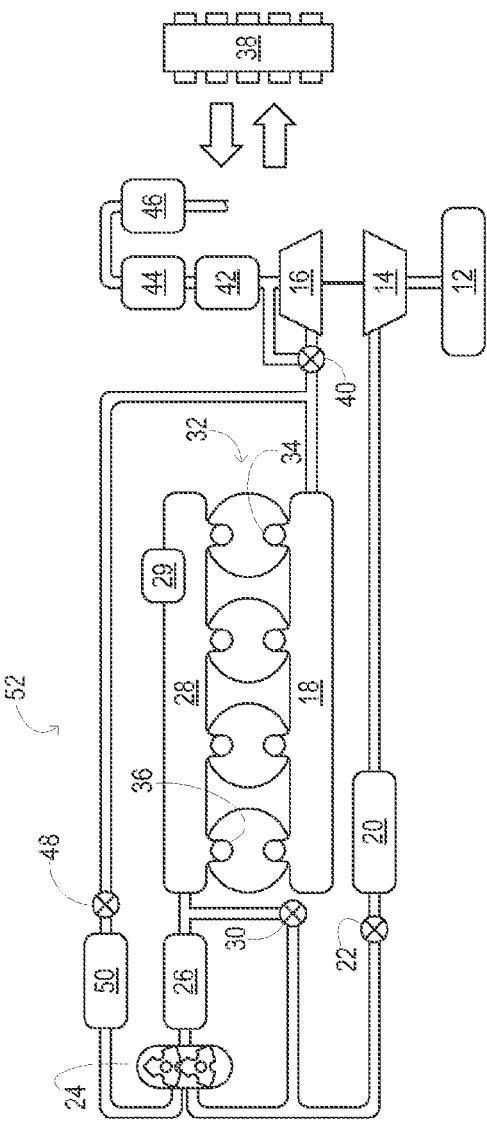

FIG. 2 schematically shows aspects of another example engine system 52 in one embodiment. In engine system 52, EGR valve 48 is coupled upstream of turbine 16 instead of downstream of the turbine, as in engine system 10. Accordingly, engine system 52 is configured to draw EGR from a high-pressure take-off point.

Various other embodiments besides those illustrated in FIGS. 1 and 2 are embraced by this disclosure. They include configurations that have no turbocharger compressor, where the air charge is compressed via the supercharger alone. They also include configurations providing both a high-pressure EGR loop and a low-pressure EGR loop in the same engine system. In such a system, exhaust gas may be recirculated through each of the respective EGR loops during different operating conditions. Thus, a plurality of different EGR modes are envisaged, which may be enacted separately or in combination. In one embodiment, the high-pressure and low-pressure EGR loops may be fully redundant, having separate coolers, control valves, and/or sensors. In other embodiments, one or more coolers, control valves and/or sensors may be shared between the different EGR loops.

Enabling multiple EGR modes in the same or different engine systems provides several advantages. For instance, cooled LP EGR may be used for low-speed operation. Here, EGR flow through turbocharger compressor 14 moves the operating point away from the surge line. Turbine power is preserved, as the EGR is drawn downstream of the turbine. On the other hand, cooled HP EGR may be used for mid-to-high speed operation. Under such conditions, where waste gate 40 may be partially open, drawing EGR upstream of the turbine will not degrade turbocharger performance. Further, as no EGR is drawn through the turbocharger compressor at this time, the operating margin between choke and overspeed lines may be preserved.

Figure 3:
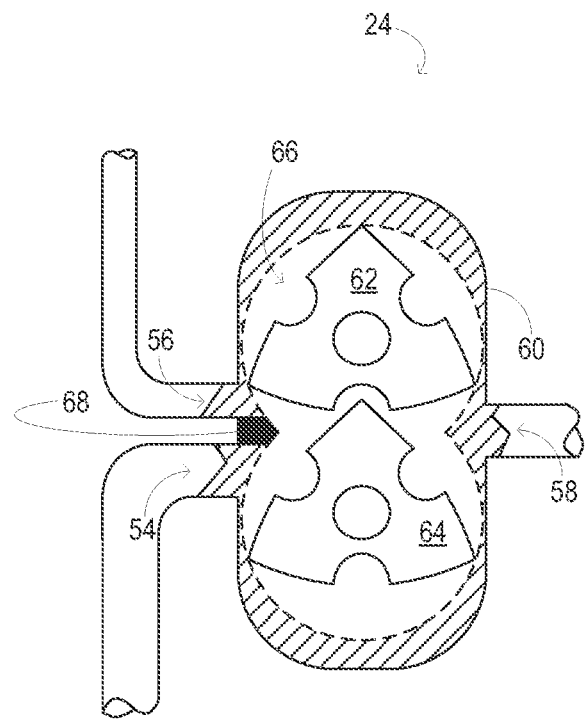
FIGS. 3 and 4 schematically show aspects of example supercharger compressors in accordance with different embodiments of this disclosure.

FIG. 3 schematically shows aspects of an example supercharger compressor 24 in one embodiment. Coupled to the upstream (low pressure) end of the supercharger compressor are air inlet 54 and EGR inlet 56. The EGR inlet is the smaller (i.e., narrower) of the two inlets. Coupled to the downstream (high-pressure) end of the supercharger compressor is outlet 58. The air inlet may be fluidically coupled to any suitable intake air conduit of the engine system in which the supercharger compressor is installed. Likewise, the EGR inlet may be fluidically coupled to any suitable exhaust conduit in which the supercharger compressor is installed. With reference to engine system 10, for example, the intake air conduit to which the air inlet is coupled may be further coupled to throttle valve 22, downstream of turbocharger compressor 14. Likewise, the exhaust conduit to which the EGR inlet is coupled may be further coupled to silencer 46, downstream of turbine 16. With reference to engine system 52, the exhaust conduit may be coupled instead to exhaust manifold 18, upstream of the turbine.

As shown in FIG. 3, supercharger compressor 24 includes housing 60, in which a plurality of rotors are rotationally mounted. The plurality of rotors may include at least two counter rotating rotors configured to mate and seal, or at least partly seal against each other. Accordingly, FIG. 3 shows first rotor 62 and second rotor 64. The housing of the supercharger compressor defines an internal cavity 66, in which the first and second rotors are rotatably mounted. In the illustrated embodiment, EGR inlet 56 delivers EGR to internal cavity 66 in an area swept through by first rotor 62; air inlet 54 delivers air to the internal cavity in an area swept through by second rotor 64.

Continuing in FIG. 3, flow separator 68 is arranged on the interior surface of housing 60. As the first and second rotors rotate within internal cavity 66, at least one peripheral region of the rotors makes contact with the flow separator, forming a slideable seal that retards or prevents mixing of pre-compressed air and EGR from the air and EGR inlets. Accordingly, the supercharger internally includes a slideable seal formed between the flow separator and at least one rotor. The slideable seal fluidically isolates the air inlet from the EGR inlet, at least in part, and retards pressure equalization therebetween. In this context, the term 'isolate' need not imply perfect isolation, but also embraces partial or effective isolation, or substantial restriction to mixing. In other words, the slideable seal substantially prevents the gases supplied to the air and EGR inlets from mixing until they enter a compression region of the supercharger (e.g., the region directly coupled to outlet 58).

In the embodiment shown in FIG. 3, flow separator 68 is fixed to housing 60. Here, the amount of recirculated exhaust admitted through EGR inlet 56 is controlled by adjusting a control valve (e.g., EGR valve 48) coupled in the exhaust conduit. In other embodiments, however, the flow separator may be movably and adjustably coupled to the housing so that movement of the flow separator relative to the housing adjusts an opening amount of the EGR inlet, thereby controlling an amount of recirculated exhaust admitted through the EGR inlet. One such embodiment is described below, with reference to FIG. 4.

Figure 4:
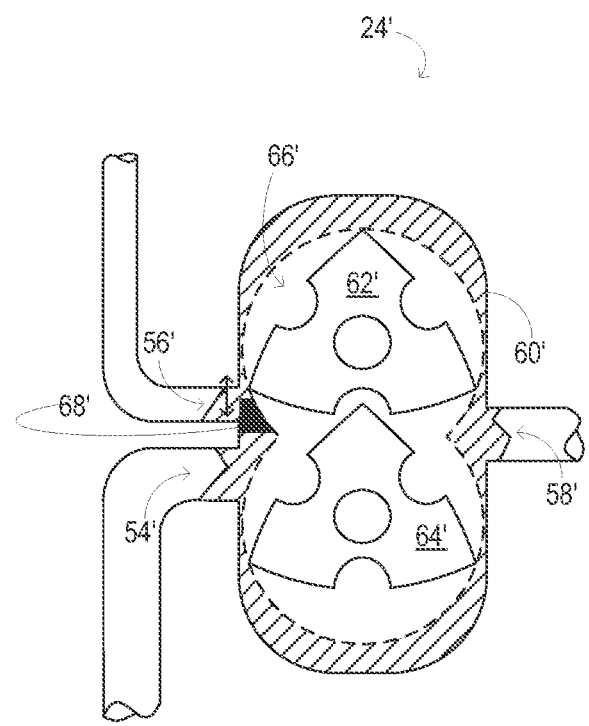

FIG. 4 schematically shows aspects of another example supercharger compressor 24' in one embodiment. In the embodiment shown in FIG. 4, flow separator 68' is slideably and adjustably coupled to housing 60' of the supercharger compressor. With this configuration, the amount of EGR admitted to the supercharger compressor can be adjusted by changing the position of the flow separator with respect to EGR inlet 56'. In particular, sliding the flow separator relative to the housing adjusts an opening amount of the EGR inlet. The flow separator, accordingly, may be mechanically coupled to an actuator (not shown in the drawings). The actuator may be operatively coupled to electronic control system 38 and used to adjust the EGR flow in the engine system. In other embodiments, the flow separator may be rotatably coupled to the housing so that rotating the flow separator relative to the housing adjusts an opening amount of the EGR inlet. Further, in some engine systems that include a supercharger compressor having an adjustable flow separator, EGR valve 48 may be omitted.

From examining the configurations described above, various advantages will be apparent. For example, using the supercharger compressor to actively pump EGR instead of relying on adventitious flow potential enables EGR to be drawn from either HP or LP take-off points at virtually any point on the engine load-speed map. Further, such versatility is provided without necessarily including an exhaust back-pressure valve in the engine system. Moreover, the volume-wise EGR flow rate from both HP and LP take-off points can be controlled in a manner that depends little on manifold air pressure, throttle inlet pressure, or various other operating conditions of the engine system.

The configurations illustrated above enable various methods for inducting air into a combustion chamber of an engine. Accordingly, some such methods are now described, by way of example, with continued reference to above configurations. It will be understood, however, that these methods, and others fully within the scope of this disclosure, may be enabled via other configurations as well.

The methods presented herein include various computation, comparison, and decision-making actions, which may be enacted via an electronic control system (e.g., electronic control system 38) of a supercharged engine system or of the vehicle in which the engine system is installed. The methods also include various measuring and/or sensing actions that may be enacted via one or more sensors disposed in the engine system (temperature sensors, pedal-position sensors, pressure sensors, etc.) operatively coupled to the electronic control system. The methods further include various valve-actuating events, which the electronic control system may enact in response to the various decision-making actions.

Figure 5:
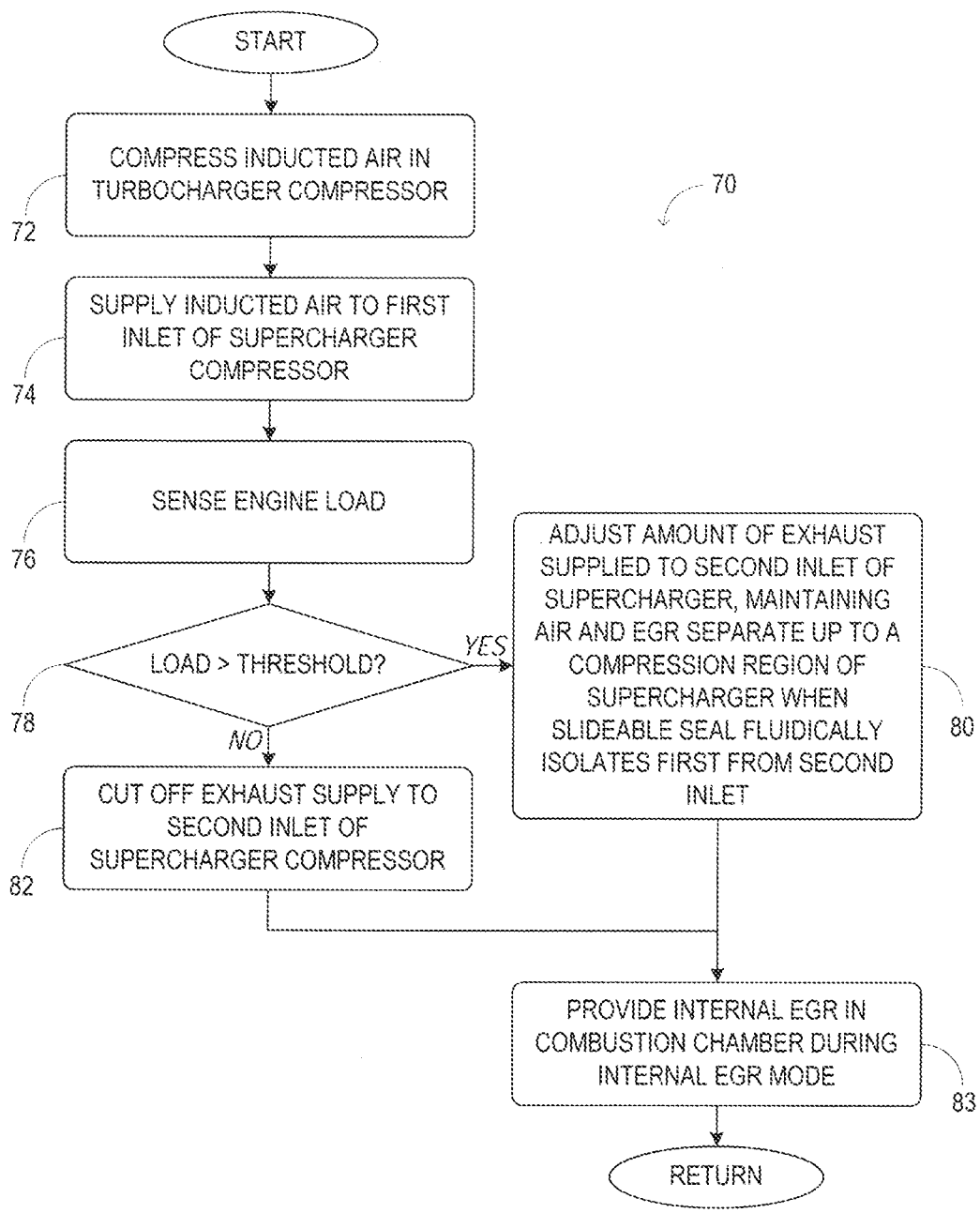
FIG. 5 illustrates a method for inducting air into a combustion chamber of a supercharged engine in accordance with an embodiment of this disclosure.

FIG. 5 illustrates an example method 70 for inducting air into a combustion chamber of a supercharged engine in one embodiment. The supercharged engine system may include an engine having a supercharger compressor coupled to an intake manifold. The supercharger compressor may have air and EGR inlets and a plurality of rotors rotatably mounted in a housing. A flow separator arranged interior the housing may be configured to form a slideable seal with at least one rotor of the plurality of rotors, thereby isolating the air inlet from the EGR inlet, as described above.

Method 70 begins at 72, where air inducted through an air cleaner is compressed in an exhaust-driven turbocharger compressor in the engine system. The method then advances to 74, where the inducted air is supplied via an adjustable throttle valve to the air inlet of the supercharger compressor. The inducted air is supplied at a first pressure, which corresponds, in one embodiment, to the boost pressure of the turbocharger compressor minus the pressure drop occurring at the throttle valve. In one embodiment, the inducted air may be cooled in a charge-air cooler upstream or downstream of the throttle valve. Further, the amount of air inducted may be adjusted according to engine speed or engine load, or desired changes thereto as determined by interrogating suitable engine system sensors (e.g., a pedal-position sensor). The method then advances to 76, where the engine load is sensed. The engine load may be sensed in any suitable manner. In one example embodiment, the manifold air pressure of the engine may be sensed and used as surrogate or predictor of engine load. The manifold air pressure may be sensed via a pressure sensor operatively coupled to an electronic control system, for example.

Continuing in FIG. 5, method 70 then advances to 78, where it is determined whether the engine load (or suitable surrogate) is above a threshold. The threshold may correspond to an amount engine load above which external EGR is useful and/or desired for regulating combustion temperature in the engine. If the engine load is above the threshold, then the method advances to 80, where the amount of exhaust supplied to the EGR inlet of the supercharger compressor is adjusted for suitable combustion and emissions-control performance. Periodic or continuous adjustment of the amount of exhaust may be made in order to control the amount of EGR provided to the combustion chambers of the engine. In one embodiment, such control may be enacted by adjusting a control valve coupled to the EGR inlet of the supercharger. In other embodiments, however, the amount of recirculated exhaust supplied through the EGR inlet may be controlled by rotating and/or sliding a flow separator of the supercharger relative to a housing of the supercharger, as described hereinabove. Accordingly, the recirculated exhaust is selectively supplied at a second pressure that may differ from the first pressure identified above. The second pressure may be based on the pressure at the EGR take-off point—the pressure upstream or downstream of a turbine, and upstream or downstream of one or more exhaust aftertreatment devices. Further, in embodiments that include an EGR control valve and EGR cooler, the second pressure may depend on flow-induced pressure drop across these components. In some embodiments, the second pressure may be greater than the first pressure, while in other embodiments, the second pressure may be less than the first pressure. Due to the inventive dual-inlet configuration of the supercharger compressor, which maintains the air and recirculated exhaust separate up to a compression region of the supercharger compressor, equalization of pressure between the air inlet and the EGR inlet may be retarded or substantially prevented.

In general, the amount of recirculated exhaust supplied through the EGR inlet may be adjusted based on suitable engine-system parameters. Such parameters may include engine speed, engine load, and/or manifold air flow; they may be sensed via appropriate sensors disposed within the engine system or calculated indirectly. In one example, the amount of recirculated exhaust supplied through the EGR inlet may be increased as engine load or manifold air flow increases, and decreased as engine load or manifold air flow decreases.

If, however, it is determined at 78 that the engine load is not above the indicated threshold, then the method advances to 82, where the exhaust supply to the EGR inlet of the supercharger compressor is cut off. In one embodiment, cutting off the supply of exhaust to the EGR inlet of the supercharger may be enacted along with enabling an internal EGR mode in one or more combustion chambers of the engine, as described hereinabove. At 83 internal EGR is provided in one or more combustion chambers during an internal EGR mode, as described hereinabove. Following step 83, method 70 returns.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:

1. A method of inducting air into an engine combustion chamber via a supercharger compressor coupled to an intake manifold, comprising:
   supplying air to a first inlet positioned upstream of the supercharger compressor at a first pressure;
   supplying recirculated exhaust to a second inlet positioned upstream of the supercharger compressor at a second pressure different from the first pressure, the supercharger compressor including a flow separator fixed to a housing; and
   compressing the air and recirculated exhaust via the supercharger compressor into the engine combustion chamber.

2. The method of claim 1, further comprising providing internal EGR in the combustion chamber during an internal EGR mode.

3. The method of claim 1, wherein supplying air to the first inlet of the supercharger compressor comprises compressing the air in an exhaust-driven turbocharger compressor.

4. The method of claim 1, wherein supplying recirculated exhaust to the second inlet comprises controlling an amount of the recirculated exhaust supplied through the second inlet by adjusting a control valve coupled to the second inlet.

5. The method of claim 1, further comprising retarding equalization of pressure between the air supplied to the first inlet and the recirculated exhaust selectively supplied to the second inlet when a slideable seal fluidically isolates the first inlet from the second inlet at least in part.

6. The method of claim 5, wherein retarding said equalization of pressure comprises maintaining the air and the recirculated exhaust separate up to a compression region within the supercharger.

7. The method of claim 1, further comprising adjusting an amount of recirculated exhaust supplied to the second inlet in response to one or more of a load, a speed and a manifold air flow rate of the engine.

8. The method of claim 1, further comprising adjusting an amount of air supplied to the first inlet, the adjusting based on engine speed and engine load.

9. A supercharger compressor comprising:
   a plurality of rotors rotatably mounted in a housing, said housing further comprising:
   a first inlet coupled to an intake air conduit of the engine system and receiving compressed air from a turbocharger compressor;
   a second inlet coupled to an exhaust conduit of the engine system and receiving exhaust gas at a location downstream from a turbocharger turbine; and
   a flow separator arranged interior the housing and configured to form a slideable seal with at least one rotor of the plurality of rotors, the slideable seal fluidically isolating the first inlet from the second inlet, at least in part, and retarding pressure equalization therebetween, wherein the flow separator is fixed to the housing.

10. The supercharger compressor of claim 9, wherein the plurality of rotors comprises at least two counterrotating rotors configured to seal against each other.

11. An engine system comprising:
    an intake air conduit in the engine system;
    an exhaust conduit in the engine system;
    a supercharger compressor in the engine system comprising a plurality of rotors rotatably mounted in a housing, a first inlet upstream of the supercharger compressor fluidically coupled to the intake air conduit, a second inlet upstream of the supercharger compressor fluidically coupled to the exhaust conduit, and a flow separator arranged interior the housing and configured to form a slideable seal with at least one rotor of the plurality of rotors, the slideable seal fluidically isolating the first inlet from the second inlet at least in part, and retarding pressure equalization therebetween, wherein the flow separator is fixed to the housing.

12. The engine system of claim 11, further comprising a turbocharger compressor mechanically coupled to an exhaust-driven turbine, wherein the intake air conduit is coupled downstream of the turbocharger compressor.

13. The engine system of claim 12, wherein the exhaust conduit is coupled downstream of the turbine.

14. The engine system of claim 12, wherein the exhaust conduit is coupled upstream of the turbine.

15. The engine system of claim 11, further comprising a control valve coupled in the exhaust conduit and configured to control an amount of recirculated exhaust admitted through the second inlet.

\* \* \* \* \*